(12) United States Patent
Umans et al.

(10) Patent No.: US 6,362,588 B1
(45) Date of Patent: *Mar. 26, 2002

(54) EXCITATION SYSTEM FOR ROTATING SYNCHRONOUS MACHINES

(75) Inventors: Stephen D. Umans, Belmont, MA (US); David J. Driscoll, South Euclid, OH (US)

(73) Assignee: Reliance Electric Technologies, LLC, Mayfield Heights, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/500,858

(22) Filed: Feb. 9, 2000

(51) Int. Cl.[7] ................................................. H02P 1/00
(52) U.S. Cl. ...................... 318/521; 318/798; 318/800; 318/638; 318/650; 318/432; 318/138; 318/254; 318/439
(58) Field of Search ................................. 318/798, 800, 318/638, 650, 432, 138, 254, 439, 521

(56) References Cited

U.S. PATENT DOCUMENTS

| 4,024,443 A | | 5/1977 | Schmucker et al. | |
|---|---|---|---|---|
| 4,283,667 A | * | 8/1981 | Dinger | 318/439 |
| 4,470,090 A | * | 9/1984 | Carr, Jr. | 318/439 |
| 5,005,115 A | * | 4/1991 | Schauder | 318/439 |

* cited by examiner

Primary Examiner—Karen Masih
(74) Attorney, Agent, or Firm—Himanshu S. Amin; Alexander M. Gerasimow; William R. Walbrun

(57) ABSTRACT

A system for providing DC current to a rotating superconducting winding is provided. The system receives current feedback from the superconducting winding and determines an error signal based on the current feedback and a reference signal. The system determines a control signal corresponding to the error signal and provides a positive and negative superconducting winding excitation voltage based on the control signal.

27 Claims, 4 Drawing Sheets

EXCITATION SYSTEM FOR ROTATING SYNCHRONOUS MACHINES

GOVERNMENT-INTEREST

This invention was made with Government support under Prime Contract No. DE-FC36-93CH10580 awarded by the Department of Energy. The Government has certain rights in this invention.

FIELD OF THE INVENTION

The invention described below generally relates to an excitation system for rotating synchronous machines, and more particularly, to a current-source excitation system for rotating synchronous machines that employ a superconducting field winding.

BACKGROUND OF THE INVENTION

Synchronous electric machines, including motors and generators, are employed in many applications requiring conversion of electrical power to mechanical power or mechanical power to electrical power. Synchronous motors, for example, may provide mechanical power for operation of factories, movement of materials, and a variety of other applications. Conversely, synchronous generators may provide electrical power in many similar applications. In order to effectively operate synchronous machines, control and excitation systems arc typically employed.

A particular aspect of synchronous machine operation is to control field-winding current of the machine. Synchronous machines often include a rotating field winding which is supplied by a DC source of power from an excitation system. With synchronous motor operation, the field winding current is typically controlled to adjust reactive power consumed by the motor. With synchronous generator operation, field-winding current is typically controlled to regulate generator output voltage and/or power factor.

Another aspect of synchronous machine operation pertains to the manner in which DC power is supplied to the field winding by the excitation system. Many conventional excitation systems employ brushes and slip rings to supply DC power to the field windings. Conventional excitation systems may eliminate the need for brushes and slip rings by employing a rotating excitation system. If conventional excitation systems are applied to rotating synchronous machines employing superconducting field windings, however, serious machine performance problems may arise due to the unique characteristics of superconducting windings.

In conventional synchronous machines, the field winding often has a relatively large winding resistance and a relatively short time constant. Therefore, conventional voltage-source excitation systems may be employed to control the field winding current. In contrast, superconducting machines typically have a very low resistance in the field winding and a relatively long time constant. Consequently, if control voltages are applied to superconducting field windings with conventional voltage-source excitation systems, significant problems may arise. For example, if voltages are applied to superconducting field windings on the order of the steady-state field winding voltage, it would take a very long time to achieve a steady-state operating current as a result of the long field winding time constant. In an example superconducting field winding with a field winding inductance of 7 Henry and a field winding resistance of 0.005 $\Omega$, the field winding time constant would be 1400 seconds. Therefore, excitation voltages several orders of magnitude greater than the steady-state operating voltages are required to rapidly change the field current. Conventional field windings, in contrast, have much shorter time constants, on the order of 2 to 4 seconds, and may only require excitation voltages of three to four times the steady-state operating voltage. Consequently, voltage-source excitation systems are inadequate to control rotating superconducting field windings.

Another challenge presented by the low field-winding resistance of superconducting machines is that small changes in field-winding voltage may produce large changes in field winding current. For example, with the above inductance and resistance, and if 100 Amperes were flowing, a steady state voltage of 0.5 Volts would be maintained across the field winding. If just a 0.2 Volt change occurred across the field winding, a large change in field current (40 Amperes) would result. Voltage changes may occur because of environmental changes such as temperature and/or from normal machine wear itself. Still yet another challenge in superconducting machines is that simply reducing the field winding voltage will not reduce the field current in acceptably reasonable amounts of time.

In view of the above issues, it would be desirable for a brushless excitation system which can accurately and rapidly control field winding current in a rotating synchronous machine.

SUMMARY OF THE INVENTION

The present invention provides a current-source excitation system to produce and control the field winding current in rotating synchronous machines. In the case of a rotating synchronous machine employing superconducting field windings, the excitation system provides DC excitation power to the superconducting field winding and eliminates the need for slip rings and brushes. A brushless implementation of the excitation system provides for lower cost and maintenance of the synchronous machine. Additionally, the present invention provides a system for inverting the field winding voltage which allows for rapid decreases in the field winding current.

More particularly, the present invention employs a current-source control system to provide closed-loop control of the field winding current. Precise and rapid control of the field winding current is achieved by applying DC voltage to the field winding, monitoring the resultant field current and controlling the current using feedback in a closed-loop system. Negative and positive DC voltages are provided by a rectification system that is controlled by the current-source control system. The rectification system also allows for brushless implementation of the excitation system.

In accordance with one aspect of the present invention, a system for providing DC current to a rotating winding is provided. A control system receives current feedback from the winding. The control system determines an error signal based on the current feedback and a reference signal. The control system determines a control signal corresponding to the error signal, and provides at least one of a positive and negative excitation voltage to the winding based on the control signal.

Another aspect of the present invention includes a system for providing DC excitation voltages to a rotating superconducting winding; including: means for receiving current feedback from the superconducting winding; means for determining an error signal based on the current feedback and a reference signal; means for determining a control signal corresponding to the error signal; and means for providing at least one of a positive and negative excitation voltage to the superconducting winding based on the control signal.

Still yet another aspect of the present invention includes a method for providing DC excitation voltages to a rotating superconducting winding; including the steps of: receiving current feedback from the superconducting winding; determining an error signal based on the current feedback and a reference signal; determining a control signal corresponding to the error signal, and providing a positive or negative superconducting winding excitation voltage based on the control signal.

Another aspect of the present invention relates to a system for providing DC excitation voltages to a rotating superconducting winding; including: a system for receiving current feedback from the superconducting winding; a system for determining an error signal based on the current feedback and a reference signal; a system for determining a control signal corresponding to the error signal, and a system for providing at least one positive and negative excitation voltage to the superconducting winding based on the control signal.

To the accomplishment of the foregoing and related ends, the invention then comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
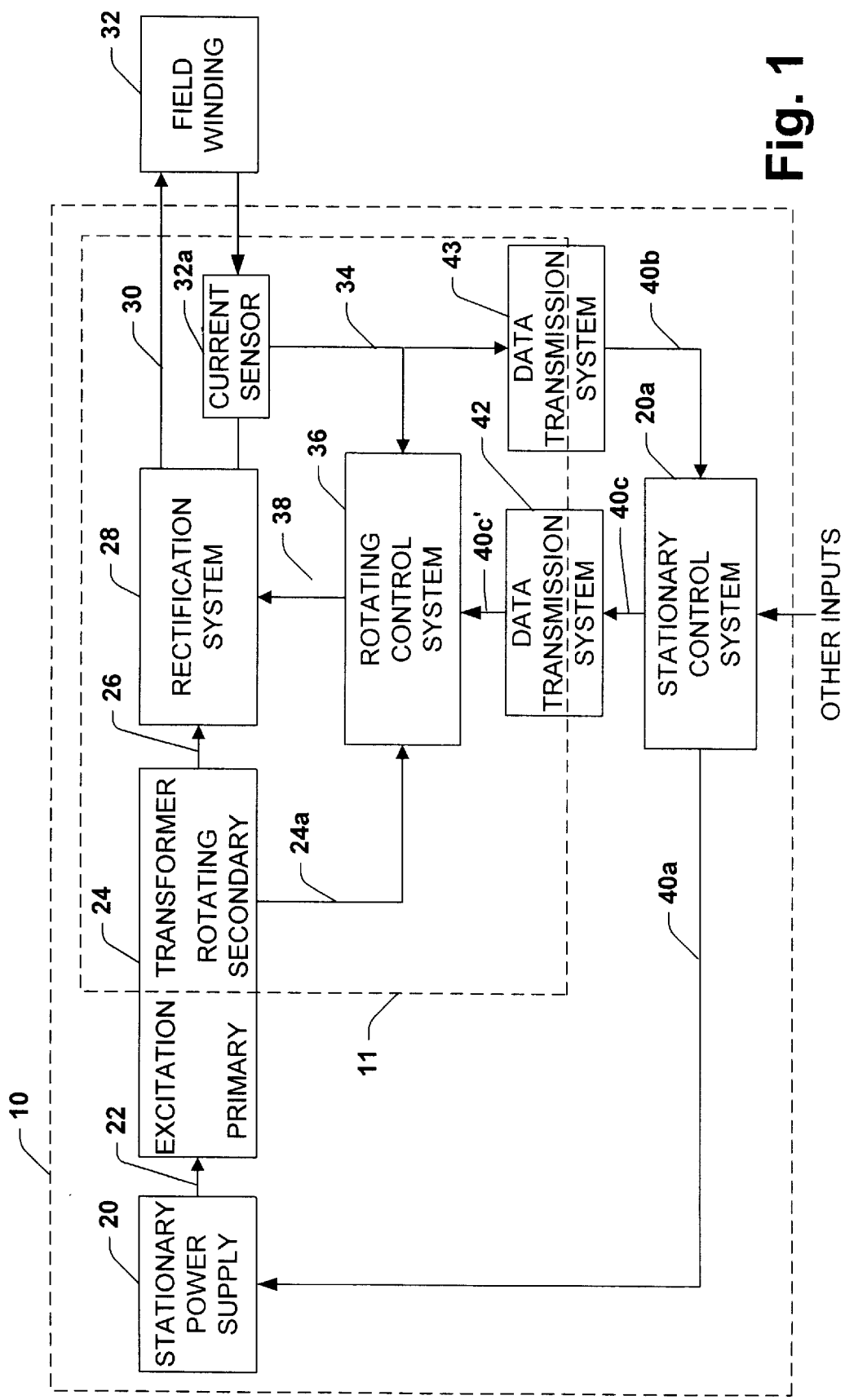
FIG. 1 is a schematic block diagram of an excitation system in accordance with the present invention.

The present invention will now be described with reference to the drawings, wherein like reference numerals are used to refer to like elements throughout.

Referring initially to FIG. 1, an excitation system 10 for providing and controlling DC field current in a rotating superconducting field winding 32 is shown. The excitation system 10 includes a stationary power supply 20 which provides AC power 22 to an excitation transformer 24. The excitation system 10 also includes a stationary control system 20a for controlling the voltage and frequency of the power supply 20, for example. The stationary control system 20a may also command and monitor changes in the steady-state operating current in the field winding 32 via control output 40a and control input 40b respectively.

The excitation transformer 24 receives AC power 22 from the stationary power supply 20 and transfers AC power to rotating portions of the excitation system 10. The rotating portions include a rectification system 28, the field winding 32, a current sensor 32a and a rotating control system 36.

The excitation transformer 24 includes a transformer with a rotating secondary to magnetically couple AC power to rotating portions 11 of the excitation system 10. In an alternative aspect of the present invention, the excitation transformer 24 and stationary power supply 20 may be replaced by an AC generator. After receiving AC power from the stationary power supply 20, the excitation transformer 24 provides AC power 26 to the rectification system 28 and provides a voltage reference signal 24a to facilitate timing in the rotating control system 36.

A phase-control signal 38 from the rotating control system 36 commands the rectification system 28 to provide a positive or negative DC excitation voltage 30 to the field winding 32. The phase-control signal 38 also controls the amplitude of the DC excitation voltage 30 supplied by rectification system 28. As described above, inversion of the DC excitation voltage 30 from positive to negative is necessary to rapidly decrease current in the low resistance superconducting field winding 32 because of the relatively long time constants associated therewith. In a conventional, non-superconducting, rotating system, positive DC excitation voltages alone may be employed to control field winding current because of the relatively high winding resistance and hence, relatively short time constant associated therewith.

The rotating secondary of the excitation transformer 24 eliminates or mitigates the need for brushes and slip rings to provide DC power to the rotating portions 11 of the excitation system 10. As will be described in greater detail below, the unique combination of the rectification system 28 and the rotating control system 36, enables the excitation system 10 to provide brushless DC excitation to the rotating superconducting field winding 32.

The current sensor 32a (e.g., resistor, hall sensor) provides a current feedback signal 34 to the rotating control system 36. The current feedback signal 34 may be combined with a reference signal 40c' from the stationary control system 20a to provide an error signal (not shown) within the rotating control system 36. The error signal is employed by the rotating control system 36 to provide the phase-control signal 38 which controls amplitude and polarity of the DC excitation voltage 30. A data transmission system 42 is provided to operatively couple the current reference signal 40c to the rotating control system 36. A data transmission system 43 may be provided to operatively couple current feedback 34, voltage feedback (not shown), and/or other feedback signals associated with rotating portions 11 of the excitation system 10, to the stationary control system 20a. Control input 40b may be employed as part of an outer control loop for the excitation system 10.

The utilization of closed-loop current feedback and control in the present invention facilitates proper control of the rotating superconducting field winding. As described above, there is simply too little resistance in the superconducting field winding to adequately control field winding current employing conventional field-voltage control. In conventional excitation systems, the field-winding voltage is primarily employed to control field current. Therefore, conventional systems may be viewed as voltage-source excitation systems. In the present invention, the field-winding current is primarily employed to control the rate of change of the field-winding current. Thus, through the employment of a feedback system which measures and compares the field current to a reference signal, the present invention may be viewed as a current-source excitation system.

As a result of the inherently low resistance of a superconducting field winding, the steady-state winding excitation voltage may be orders of magnitude below the maximum voltage output capability of the excitation system 10 as determined by a desired rate of change in the field winding current. Additionally, the dominant resistance as seen by the excitation system 10 is likely to be that of the leads and connecting hardware of the field winding 32 which can change with temperature as the machine operates. Thus, a current-source excitation system 10 is well suited to control a rotating superconducting field winding 32.

As discussed above, the rotating control system 36 determines an error signal from the reference signal 40c' and the current feedback signal 34. From the error signal 34, the control system 36 controls the magnitude and polarity of the DC excitation voltage 30 from the rectification system 28 by determining the timing of a set of output pulses shown as the phase-control signal 38. The timing of the output pulses is in relation to the zero-crossing applied reference signal 24a from the excitation transformer 24.

Figure 2A:
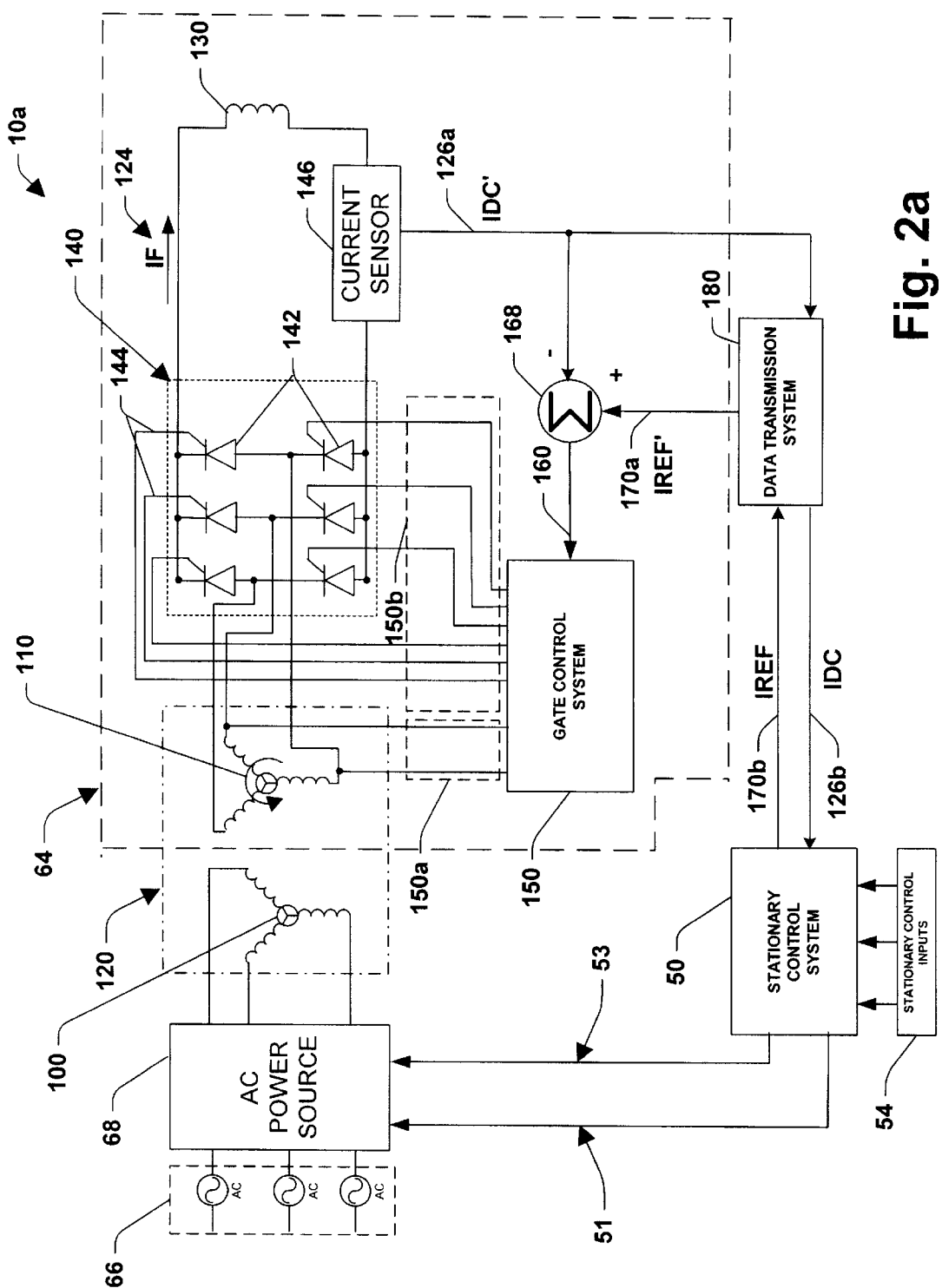
FIG. 2a is a detailed schematic diagram for an excitation system in accordance with the present invention.

Now referring to FIG. 2a, a schematic diagram of an excitation system 10a is illustrated in accordance with the present invention. System 10a includes a rotating system 64 which is operatively coupled to a stationary control system 50 and a stationary AC power source 68. The stationary control system 50 is coupled to the AC power source 68 which receives power from a three-phase AC power input 66. The AC power source 68 is a three-phase inverter and may receive a voltage reference 51 and a frequency reference 53 input from the stationary control system 50. The voltage reference 51 and frequency reference 53 inputs determine the magnitude of the output voltage and frequency provided by the three-phase-inverter 68 to a three-phase stator winding 100 of an excitation transformer 120. In the preferred embodiment, the frequency will be set at about 30 to 60 Hz, although other frequencies may be employed. The magnitude of the three-phase inverter 68 output voltage is determined by a control algorithm within the stationary control system 50.

As voltage is provided to the windings of the stator 100 from the three-phase-inverter 68, AC voltage is magnetically induced into a three-phase rotor windings 110 of the excitation transformer 120. When the rotor 110 is stationary, the rotor frequency will be equal to that of the stator 100. When the rotor 110 rotates, the rotor frequency will be equal to the slip times the stator frequency. For example, for a 4-pole excitation transformer wherein the stator is excited at 60 Hz, if the rotor 110 rotates opposite to the direction of the stator-produced rotating flux wave, the rotor frequency will be 120 Hz when the rotor reaches a speed of 1800 rpm.

The induced AC voltage in the rotor windings is coupled to a phase-controlled rectification system 140 which provides rectification of the AC voltage to produce DC field current (IF) 124 in the superconducting field winding 130. The phase-controlled rectification system 140 also provides voltage inversion capabilities to allow the DC field current 124 to be rapidly decreased in the superconducting field winding 130. The field current 124 is controlled by the phase-controlled rectification system 140 by regulating the voltage supplied to the field winding 130.

The phase-controlled rectification system 140 includes silicon-controlled rectifiers (SCR's) 142. It is to be appreciated that other controllable switching devices may be employed such as other types of semiconductor switching devices. The function of the SCR's 142, is to rectify AC output voltage of the excitation transformer 120 and to provide positive and negative DC voltage to the field winding 130. The excitation transformer 120 along with the phase-controlled rectification system 140, facilitate brushless implementation of a superconducting machine by eliminating or mitigating the need for slip rings and brushes to provide DC power to the field winding 130. As mentioned above, voltage inversion provides for a rapid decrease of the field current 124. The gate elements 144 control the magnitude and polarity of the voltage from the SCRs 142 and are controlled by a gate control system 150. The gate control system 150 determines the timing of gate output pulses 150b in relation to a zero-crossing applied reference voltage 150a from the secondary of the excitation transformer 120.

The gate control system 150 controls the gate outputs 150b based upon a current error signal 160. The error signal 160 is produced at a summing junction 168 as the difference between a desired current reference signal IREF' 170a and a current feedback signal IDC' 126a. The summing junction 168 may be any suitable system or device for producing an error signal 160 such as a difference amplifier, for example. IDC 126a is a voltage proportional to the field current 124 and is output by a current sensor 146. The current sensor 146 may be a resistor or a Hall sensor, for example. It is to be appreciated that any suitable current sensing technique may be employed. IREF' 170a is transmitted from the stationary control system 50 to command the desired level of the field winding current 124. When IREF' 170a increases or decreases, the error signal 160 from the summing junction 168 will increase or decrease causing the gate control system 150 to alter and/or invert the field winding voltage. For example, when the error signal 160 increases or decreases, the gate control output pulses 150b will alter the gate timing to increase, decrease, and/or invert the field winding voltage. The gate control system 150 may employ control algorithms to control the gate elements 144 which are derived from the input error signal 160.

A data transmission system 180 is employed to transmit an IREF 170b signal from the stationary control system 50 to the rotating system 64. Note that IREF 170b becomes IREF' 170a after passing through the data transmission system 180. Likewise, IDC' 126a may be transmitted from the rotating system 64 to the stationary control system 50 and becomes IDC 126b. It is noted that IDC 126b is not required for operation of the excitation system 10a, however, it may be employed for additional control of the field-winding current 124 as part of an outer control loop associated with the stationary control system 50. Any suitable transmission system may be employed to transmit IREF' 170a and/or IDC' 126a to and from the rotating system 64. Suitable transmission systems may include rotating transformers, radio frequency systems, and optical systems. The present invention may employ an optical system which encodes data in the form of frequency modulation. The modulated data may be decoded using a phase-locked loop, however, it is to be appreciated that a plurality of decoding schemes may be employed.

After receiving IDC 126b from the data transmission system 180, the stationary control system 50 may adjust IREF 170b according to stationary control inputs 54. The stationary control inputs 54 may include values for desired field current, desired motor power factor, measured motor speed, measured armature current, measured armature voltage, and measured power factor. Based upon the stationary control inputs 54, the stationary control system 50 may adjust IREF 170b to produce changes in field current 124.

Figure 2B:
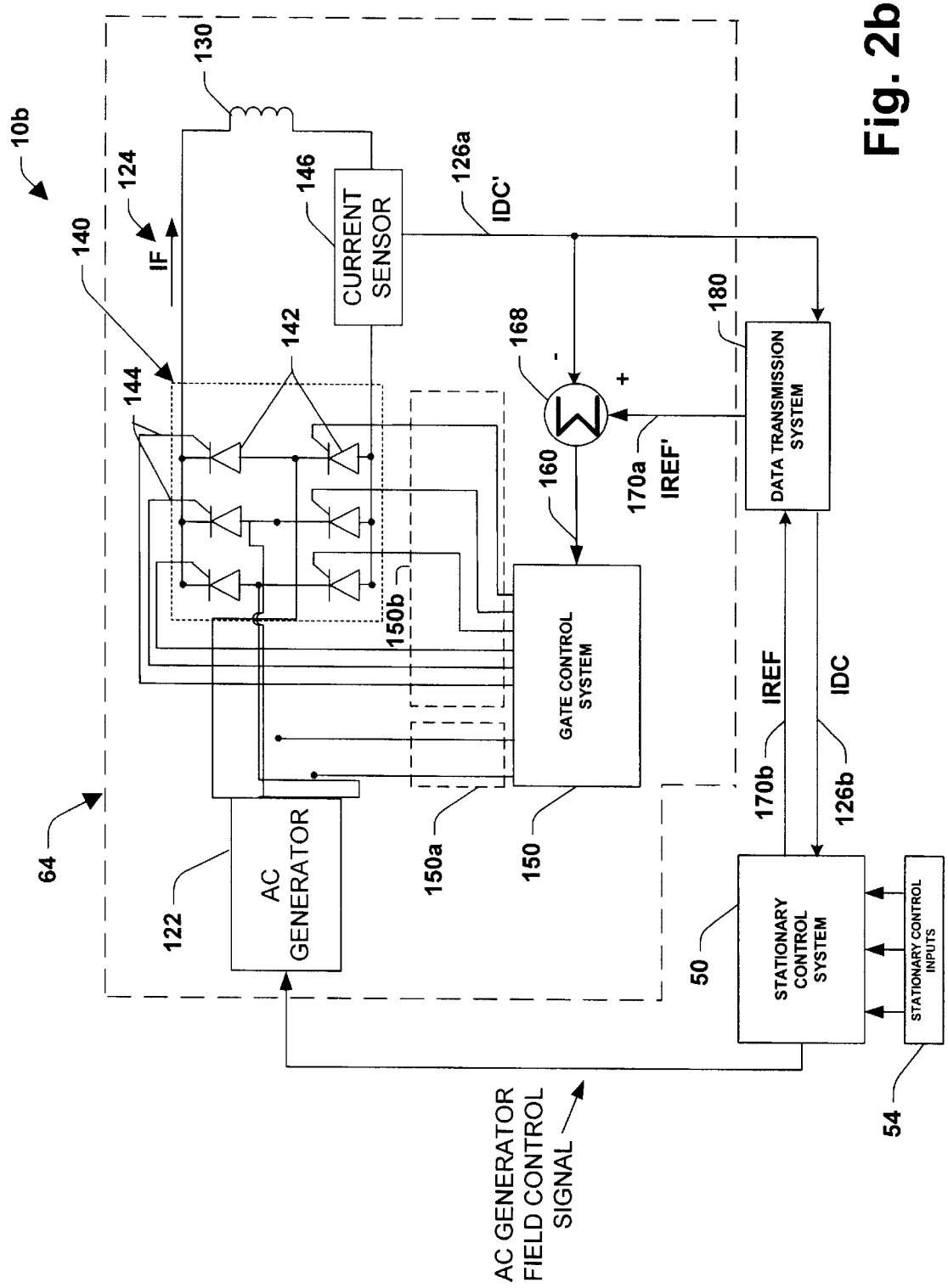
FIG. 2b is a detailed schematic diagram for another excitation system in accordance with the present invention.

Referring now to FIG. 2b, another aspect of the present invention is illustrated. An excitation system 10b is shown which employs an AC generator with a rotating armature 122 which is comparable to the three phase inverter 68 and excitation transformer 120 depicted in FIG. 2a. The AC generator 122 is coupled to the rotor shaft (not shown) of the synchronous generator. It is noted that the system 10b is not necessarily applicable to synchronous motors which may require field winding excitation when stationary or at low speeds. As the rotor of the generator rotates, the AC generator 122 produces a three-phase AC voltage for the phase-controlled rectification system 140. The remaining operation of the excitation system illustrated in FIG. 2b is as described above in FIG. 2a and will not be re-described for purpose of brevity.

Figure 3:
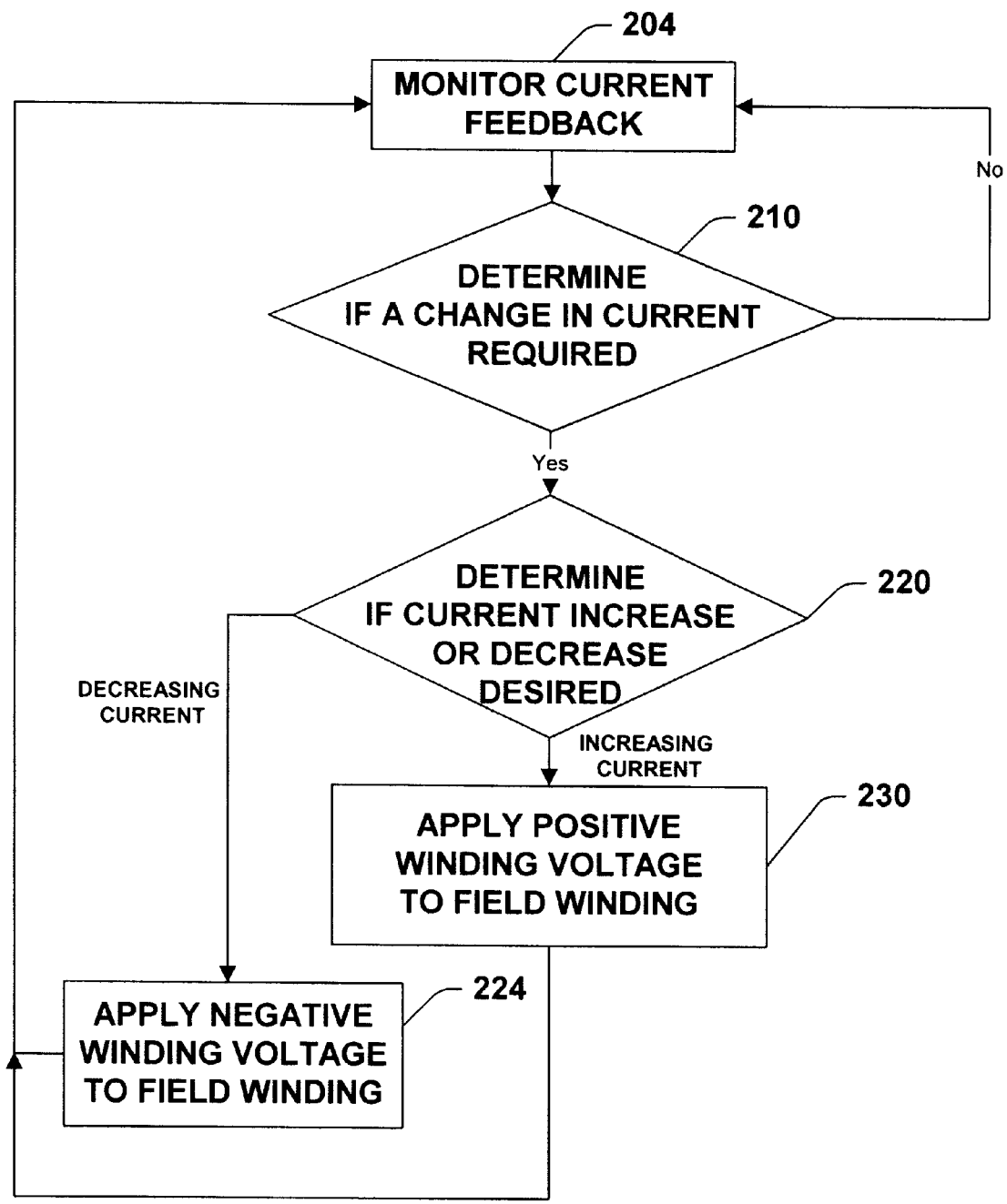
FIG. 3 is a block diagram methodology for providing DC excitation voltages in accordance with the present invention.

Referring now to FIG. 3, a flow diagram is shown which illustrates a methodology for providing DC excitation voltages to superconducting field windings in accordance with the present invention. At step 204, the system monitors field-winding current. At step 210, a determination is made as to whether a change in current is desired by determining if a difference exists between a steady-state field current and a reference field current. If no change in current is desired, the process returns to step 204 and continues monitoring field winding current. If a change in current is desired, the process proceeds to step 220 wherein a determination is made as to whether current should be increasing or decreasing in value by comparing a desired reference current with the steady-state current. If the reference current value is greater than the steady-state current value, the process proceeds to step 230. If the reference current is less than the steady-state current, the process proceeds to step 224.

If a desired current increase was determined at step 220, a positive winding voltage is applied to the field winding at step 230, and the process returns to step 204 to monitor current. The positive winding voltage may be reduced to a smaller positive voltage at step 210 when the steady-state current becomes equal to the reference current.

If a desired current decrease was determined at step 220, a negative winding voltage is applied to the field winding at step 224, and the process returns to step 204 to monitor current. The negative winding voltage may be returned to a small positive value at step 210 when the steady-state current becomes equal to the reference current.

It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for providing DC current to a rotating superconducting winding, comprising:
   a control system for receiving current feedback from the superconducting winding, the control system determining an error signal based on the current feedback and a reference signal, the control system determining a control signal corresponding to the error signal, and providing at least one of a positive and negative superconducting winding excitation voltage based on the control signal, the excitation voltage having an adjustable magnitude to control the DC current.

2. The system of claim 1, further including a rectification system for providing a positive and negative winding excitation voltage.

3. The system of claim 2, the rectification system employing controllable switching devices for providing a positive and negative winding excitation voltage.

4. The system of claim 3, wherein the controllable switching devices comprise a semiconductor device.

5. The system of claim 1, further including a stationary control system for providing the reference signal.

6. The system of claim 1, further including a resistive element for providing the current feedback to the control system.

7. The system of claim 1, further including a Hall sensor for providing the current feedback to the control system.

8. The system of claim 1, further including a summing system to combine the current feedback with the reference signal to produce the error signal.

9. The system of claim 5, the stationary control system receiving user defined inputs to modify the reference signal.

10. The system of claim 2, further including a source of AC power for providing AC power to the rectification system.

11. The system of claim 10, the AC power source employing a transformer system with a rotating secondary.

12. The system of claim 10, the AC power source employing an AC generator.

13. A system for providing DC excitation voltages to a rotating superconducting winding, comprising:
   means for receiving current feedback from the superconducting winding;
   means for generating an error signal based on the current feedback and a reference signal;
   means for generating a control signal in response to the error signal;
   means for generating a positive and a negative superconducting winding excitation voltage in response to the control signal; and
   means for controlling the magnitude of the positive and negative superconducting winding excitation voltages to adjust the current in the superconducting winding.

14. A method for providing DC excitation voltages to a rotating superconducting winding, comprising:
   receiving current feedback from the superconducting winding;
   determining an error signal based on the current feedback and a reference signal;
   determining a control signal corresponding to the error signal; and
   generating an adjustable magnitude positive and negative superconducting winding excitation voltage based on the control signal.

15. A system for providing DC excitation voltages to a rotating superconducting winding, comprising:
   a system for receiving current feedback from the superconducting winding;
   a system for determining an error signal based on the current feedback and a reference signal;
   a system for determining a control signal corresponding to the error signal; and
   a system for providing a positive and negative superconducting winding excitation voltage based on the control signal, the excitation voltage having a controllable magnitude to adjust the current in the superconducting winding.

16. The system of claim 15, further including a rectification system for providing a positive and negative winding excitation voltage.

17. The system of claim 16, the rectification system employing controllable switching devices for providing a positive and negative winding excitation voltage.

18. The system of claim 17, wherein the controllable switching devices comprise a semiconductor device.

19. The system of claim 15, further including a stationary control system for providing the reference signal.

20. The system of claim 15, further including a resistive element for providing the current feedback to the control system.

21. The system of claim 15, further including a Hall sensor for providing the current feedback to the control system.

22. The system of claim 15, further including a summing system to combine the current feedback with the reference signal to produce the error signal.

23. The system of claim 19, the stationary control system receiving user defined inputs to modify the reference signal.

24. The system of claim 16, further including a source of AC power for providing AC power to the rectification system.

25. The system of claim 24, the AC power source employing a transformer system with a rotating secondary.

26. The system of claim 24, the AC power source employing an AC generator.

27. A system for providing DC current to a rotating superconducting winding, comprising:
a control system for receiving current feedback from the superconducting winding, the control system determining an error signal based on the current feedback and a reference signal, the control system determining a control signal corresponding to the error signal, and providing at least one of a positive and negative brushless superconducting winding excitation voltage based on the control signal, the excitation voltage having a controllable magnitude to increase and decrease the DC current.

* * * * *